United States Patent [19]

Kurisu

[11] 3,971,265
[45] July 27, 1976

[54] MANUAL AUTOMOTIVE TRANSMISSION

[75] Inventor: Katsuyasu Kurisu, Kawasaki, Japan

[73] Assignee: Nissan Motor Co., Ltd., Yokohama, Japan

[22] Filed: July 29, 1974

[21] Appl. No.: 492,870

[30] Foreign Application Priority Data
July 31, 1973 Japan........................ 48-89883[U]

[52] U.S. Cl................................. 74/475; 74/473 R
[51] Int. Cl.²......................................... B60K 20/08
[58] Field of Search.......... 74/475, 476, 477, 473 R, 74/473 P

[56] References Cited
UNITED STATES PATENTS

| | | |
|---|---|---|
| 3,016,759 | 1/1962 | Fletcher............................... 74/475 |
| 3,245,278 | 4/1966 | Mattausch ........................ 74/476 X |
| 3,347,108 | 10/1967 | Hinke .............................. 74/477 X |
| 3,387,501 | 6/1968 | Frost................................. 74/477 X |
| 3,452,614 | 7/1969 | Conkle..................................... 74/477 |
| 3,500,697 | 3/1970 | Schowalter ...................... 74/475 X |
| 3,581,594 | 6/1971 | Longshore ............................ 74/475 |
| 3,857,299 | 12/1974 | Morrison ......................... 74/475 X |

*Primary Examiner*—Samuel Scott
*Assistant Examiner*—Lance W. Chandler

[57] ABSTRACT

The fork rod is provided with a step. A force tending to disengage engaged gears produces a moment which causes pivotal rotation of the fork rod, so that the step engages with an abutment formed on one of the fork rod supports preventing gear disengagement. A spring-biased detent ball disposed within the support restrains vibration of the fork rod and maintains the rod in proper position as well.

1 Claim, 4 Drawing Figures

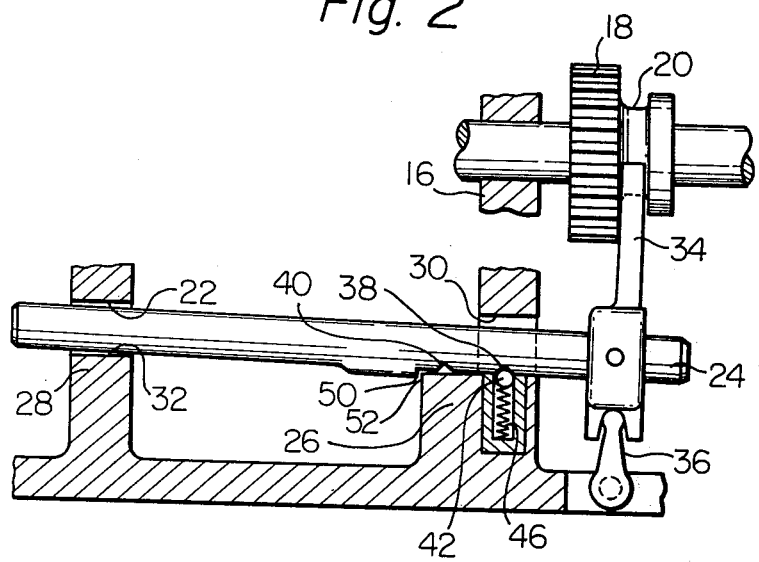
Fig. 2
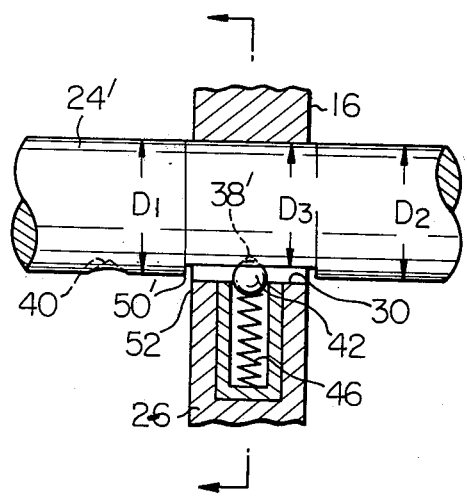
Fig. 3
Fig. 4

MANUAL AUTOMOTIVE TRANSMISSION

This invention relates generally to a manual automotive transmission and particularly to a lock system for preventing disengagement of gears engaged for a selected input-output shaft speed ratio in the transmission.

In a conventional manual transmission of a motor vehicle, a gear component is slidably mounted on a shaft and a fork rod having a fork at its one end is provided for shifting or sliding the gear component to engage with other selected gear components to establish desired selected input-output shaft speed ratios.

In such a transmission it has been found that the slidably mounted gear may become disengaged while the automobile is running with the transmission set to a given ratio.

Therefore the fork rod is usually provided with a spring-biased detent to maintain the fork rod in the position selected thus to keep the selected gear components in engagement.

The inadvertent disengagement results from a force tending to disengage the gears meshed with each other due to manufacturing inaccuracies or wear of the gear components, especially misalignment of the surfaces of the teeth or of the gear shafts.

Such disengagement results in engine over speeding which can be detrimental to the engine, or a seriously dangerous condition on a highway due to loss of the engine brake effect. Even when the disengagement is not a complete one, it results in a partial meshing of the gears leading to excessive wear in a short driving period.

Therefore, an object of the invention is to provide a manual automotive transmission in which the engagement of the gears is maintained as long as the transmission is set to a selected input-output shaft speed ratio.

Another object of the invention is to provide a transmission with means for locking the movement of the fork rod to prevent disengagement of engaged gears when a force is generated tending to disengage them.

A further object of this invention is to provide a simple structure for preventing disengagement of engaged gears in a transmission.

Still another object of the invention is to provide a structure in a transmission to prevent unwanted disengagement of engaged gears which is free from noise and vibration.

A preferred embodiment of this invention as applied to the reverse input-output shaft speed ratio power train will be described with reference to the accompanying drawings, in which:

FIG. 2 is an elevation view similar to FIG. 1 showing the transmission fork rod in locked position;

FIG. 3 is a partial elevation view showing another type of a fork rod for use in a transmission of this invention; and FIG. 4 is a section view taken on the line X—X of FIG. 3.

Figure 1:
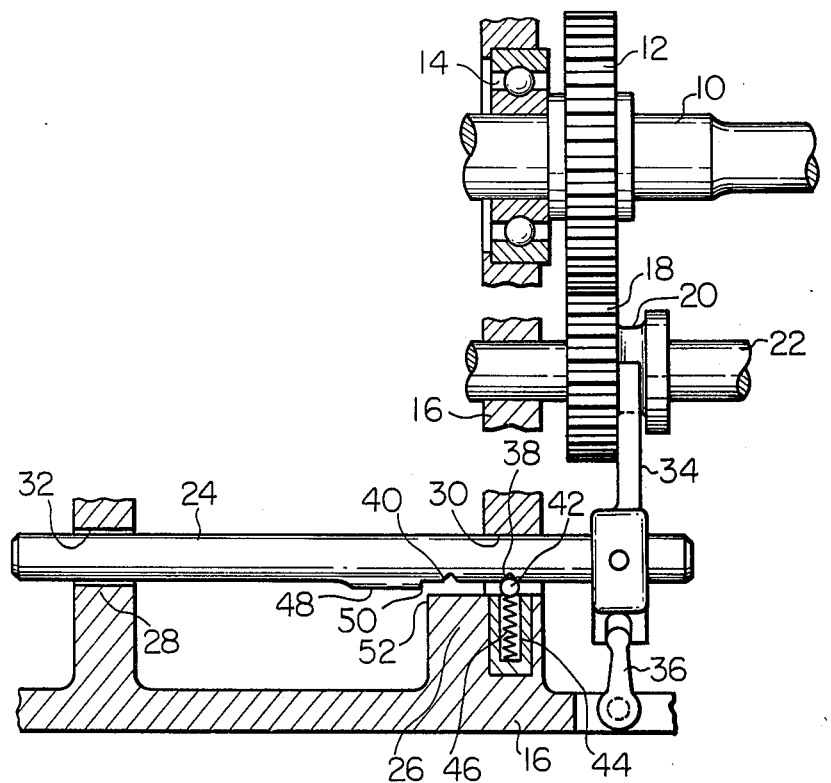
FIG. 1 is a partial elevation view partly in section of a transmission embodying the invention.

Referring to FIG. 1, an output shaft 10 having a reverse gear 12 fixed thereon is supported through a bearing 14 mounted in a transmission case 16, and a reverse idler gear 18 having an annular groove 20 on an axial extension on one side is mounted to freely rotate on an idler shaft 22.

To shift the reverse idler gear 18 for engagement, a fork rod 24 or shifter is provided parallel to the idler shaft 22, said fork rod being slidably supported in and by wall portions of the case 16 or in and by first and second supports 26 and 28 provided with aligned bores 30 and 32 which have larger diameters than the rod 24. The fork rod 24 has a fork 34 at its right end as shown in the drawings. The fork 34 receives the annular groove 20 of the reverse idler gear 18 at its upper end, and at its lower end the fork 34 engages the end of a reverse lever 36 which is movably mounted on the case 16 for operating the fork rod 24 as shown in FIG. 1. The fork rod 24 has notches 38 and 40 to receive a detent ball 42 projecting from a pocket 44 or blind hole in the support 26 the pocket 44 containing a spring 46 to urge the ball 42 into notch 38 or 40 to hold the fork rod 24 in the desired position.

The notch 38 is engaged when the reverse gear 12 and the reverse idler gear 18 are engaged and the notch 40 is engaged when the gears are disengaged or the transmission is in neutral. Near the notches 38 and 40 there is provided a stepped-up portion 48 on the fork rod 24.

The stepped-up portion 48 provided a shoulder or step 50 extending partially around the periphery of the fork rod 24.

The bore 30 in the support 26 which guides the fork rod 24 is large enough to provide clearance for smooth vertical movement (as seen in FIG. 1) of the fork rod 24 and the bore 32 provides sufficient clearance to pivot about it to a limited degree. Bore 32 is the fulcrum of the pivotal movement.

A portion of the support 26 forms an abutment 52 which engages the step 50 of the fork rod 24 when, at the position corresponding to engagement of the reverse gear 12 and the reverse idler gear 18, the fork rod 24 pivots clockwise about its fulcrum, i.e., the bore 32.

When the transmission is shifted by the driver to reverse drive, the reverse lever 36 is rotated counterclockwise to the position shown in FIG. 1 through a linkage (not shown).

Consequently, the reverse lever 36 slides the fork rod 26 together with the fork 34 to the left and, in turn, the fork 34 moves the reverse idler gear 18 to engage the reverse gear 12. Thus the reverse idler gear 18 meshes with the reverse gear 12 and with a countershaft gear (not shown) as is usual in conventional transmissions, to establish the reverse drive power train consisting of an input shaft gear (not shown), a countershaft gear (not shown), the reverse idler gear 18 and the reverse gear 12 on the output shaft 10.

When the transmission is set to reverse drive, the spring biased detent ball 42 is engaged with the notch 38 of the fork rod 24 to maintain the fork rod 24 in the upper position as shown in FIG. 1.

If a force is produced tending to disengage the gears by pushing the reverse idler gear 18 to the right, a clockwise moment of the fork rod 24 is produced, having a moment arm of the length measured from the axis of the fork rod 24 to the point of load on the fork 34.

The fork rod 24 pivots clockwise within the bore 32 as the fulcrum if the moment is large enough to overcome the bias of the spring 46. This causes fork rod 24 to move to the position shown in FIG. 2.

As best been in FIG. 2, the step 50 of the fork rod 24 engages after the pivotal movement of the fork rod 24 described above, with the abutment 52 thus preventing rightward movement of the fork rod 24. When shifting back to neutral or disengagement position, the reverse lever 36 is rotated clockwise.

This provides a force directed to the right at the lower end of the fork 34, producing a counter or anticlockwise moment on the fork rod 24.

This moment, together with the force of the bias of spring 46, causes the fork rod 24 to pivot counterclockwise about the bore 32 to disengage the step 50 from abutment 52 so that the fork rod 24 slides uninhibitedly to the right, disengaging the reverse gear 12 from the reverse idler gear 18.

The fork rod 24 is then maintained in the disengaged position by the spring biased detent ball 42 which now engages the notch 40.

As previously mentioned, the spring biased detent ball 42 is provided in the support 26 which is near the rod end where the fork 34 is attached, and the detent ball pushes the fork rod 24 up against the upper wall of the bore 30 (see FIG. 1). Moreover the detent ball 42 is provided close to the step 50 and abutment 52.

Therefore the fork rod 24 as well as the fork 34 are effectively restrained from vibrating despite the relatively large clearance between the fork rod 24 and the bore 30 in the support 26.

The step 50 on the fork rod 24 may have another different form as shown in FIGS. 3 and 4.

The fork rod 24' has separate concentric portions with diameters $D_1$ and $D_2$, which may be the same, and a non-concentric portion therebetween with a diameter $D_3$ which is smaller than $D_1$ and $D_2$.

This non-concentric portion is formed so that it extends over the full length of the bore 30 when the fork rod 24' is in the position to establish the reverse drive, and to have a step 50' extending around the lower side of the fork rod 24'. There is provided a notch 38' at the bottom of the non-concentric portion of the fork rod 24' as well as a notch 40' in the portion having the diameter $D_1$, corresponding to the notches 38 and 40, respectively, shown in FIG. 1 and FIG. 2.

Thus in a case where a force tending to disengage engaged gears is produced, the step 50' engages with the abutment 52 of the support 26 preventing movement of the fork rod 24' in the same manner as described above in connection with the FIG. 1 embodiment.

What is claimed is:

1. In a manual automotive transmission having a case, input and output means mounted in said case, gear means operable to connect said input means to said output means, manually operable means including a slidable shifting rod with a fork at one end and supported at opposite ends axially slidably in first and second supports formed on said case, said first support being adjacent said fork and between said second support and said fork, and said shifting rod having a first position wherein said shifting rod allows said gear means to connect said input means to said output means and a second position wherein said shifting rod allows said gear means to disconnect said input means from said output means, said shifting rod being pivotable with said second support as a fulcrum and formed with a step portion selectively engageable with an abutment formed on said first support; the improvement in that said first support has biasing means including a spring biased detent ball disposed in a pocket formed in said first support for biasing said shifting rod in a direction to disengage said step portion of said shifting rod from said abutment of said first support, whereby when said shifting rod takes said first position thereof, said shifting rod is pivoted against the biasing force of said biasing means in response to a force generated by said gear means in another direction to engage said step portion with said abutment, and the engagement of said step portion with said abutment is maintained until said shifting rod is manually operated to slide to said second position by a force produced by the manual operation of said gear means.

* * * * *